United States Patent [19]

Kliman et al.

[11] Patent Number: 5,053,666

[45] Date of Patent: Oct. 1, 1991

[54] CONSTRUCTION OF RELUCTANCE MOTORS

[75] Inventors: Gerald B. Kliman, Schenectady, N.Y.; Eike Richter, Cincinnati, Ohio

[73] Assignee: General Electric Company, Schenectady, N.Y.

[21] Appl. No.: 202,354

[22] Filed: Jun. 6, 1988

[51] Int. Cl.⁵ .............................................. H02K 1/22
[52] U.S. Cl. ..................................... 310/261; 310/62; 310/64; 310/91; 310/218
[58] Field of Search ............... 310/261, 262, 263, 264, 310/265, 267, 42, 43, 211, 216, 217, 218, 61, 62, 63, 168, 169, 170, 155, 64, 91, 254

[56] References Cited

U.S. PATENT DOCUMENTS

| | | | |
|---|---|---|---|
| 1,988,039 | 1/1935 | Grob | 310/265 |
| 2,113,226 | 4/1938 | Young | 310/169 |
| 2,820,914 | 1/1958 | Rudoff | 310/43 |
| 3,157,806 | 11/1964 | Wiedemann | 310/262 |
| 3,244,919 | 4/1966 | Drenth | 310/261 |
| 3,737,696 | 6/1973 | Richter et al. | 310/168 |
| 4,136,296 | 1/1979 | Hickey | 310/269 |
| 4,263,711 | 4/1981 | Sakano | 310/43 |
| 4,348,605 | 9/1982 | Torok | 310/152 |
| 4,916,346 | 4/1990 | Kliman | 310/42 |

FOREIGN PATENT DOCUMENTS

| | | | |
|---|---|---|---|
| 1166907 | 11/1958 | France | 310/43 |
| 1210349 | 3/1960 | France | 310/43 |
| 1236653 | 6/1960 | France | 310/43 |
| 0008802 | of 1904 | United Kingdom | 310/269 |
| 0934287 | 8/1963 | United Kingdom | 310/269 |

Primary Examiner—R. Skudy
Attorney, Agent, or Firm—Marvin Snyder; James C. Davis, Jr.

[57] ABSTRACT

An improved reluctance motor with reduced windage losses and reduced internal rotor stresses is proposed. The reluctance motor is constructed with continuous, non-magnetic supported members in the interpolar spaces of the salient pole rotor. End plates may be added to the rotor which are attached to the support members creating a "cage" structure which supports the rotor. In addition, the rotor through shaft may be eliminated by providing stub shafts on the cage end plates to transmit torque from the rotor. Various methods of constructing the rotor of the invention are also described.

14 Claims, 6 Drawing Sheets

CONSTRUCTION OF RELUCTANCE MOTORS

The present invention relates in general to an improved reluctance motor rotor and a method of manufacturing said rotor, and more particularly to a reluctance motor rotor with lower windage losses than salient rotors and with lower rotational stress within the rotor laminations.

BACKGROUND OF THE INVENTION

Reluctance motors are doubly salient, that is, they have tooth-like poles on both the stator and the rotor. In addition, there are windings on the stator but no windings on the rotor of reluctance motors. Each pair of diametrically opposite stator windings is connected in series to form one phase of the motor.

Torque is produced in variable reluctance motors by switching current on in the stator phases in a predetermined sequence so that a magnetic force of attraction results between the rotor and stator poles as they approach each other. The current is switched off in each pair of windings at the commutation point before the rotor poles nearest the stator poles of that pair of windings rotate past the aligned position, otherwise the magnetic force of attraction will produce a negative or braking torque.

The torque developed is independent of current direction. Therefore, unidirectional current pulses synchronized with rotor movement can be generated in a converter using a single unidirectional current switching element such as a thyristor or transistor in each leg of the converter, and supplied to the corresponding phase of the motor.

Each time a phase of the motor is energized by closing a switch in the converter, current flows in the pair of stator windings of that phase, providing energy from a DC supply to the motor. The energy drawn from the supply is converted partly into mechanical energy, by causing the rotor to rotate towards a minimum reluctance configuration, and converted partly into stored energy in the magnetic field. When the switch is opened, the stored magnetic energy is preferably returned to the DC supply.

The motor may be run open-loop as in a variable reluctance stepping motor, or may be run closed-loop as in a switched reluctance motor. In addition, the motor may be operated such that no two phases are conducting simultaneously (i.e. nonoverlapping conduction intervals) or such that some phases do conduct simultaneously (i.e. overlapping conduction intervals). Furthermore, the same machine may be operated as a generator by driving the rotor and changing the timing of the switches in the converter with respect to the rotor position.

Reluctance rotors are very attractive candidates for high operating speeds due to their simple rotor structure. The active portion of the rotor is normally constructed using only magnetic laminations as no windings or permanent magnets are necessary. Such rotors incur high windage losses as a result of their salient structure. In addition, in order to operate at high speeds, the rotor will incur internal forces close to the stress limits of the lamination material. These stresses come directly from centrifugal forces and indirectly from the shrink fit required to prevent a loss of mechanical contact between the laminations and the shaft at high speeds.

It has been proposed that salient pole motors could be strengthened, while reducing the windage losses, by fabricating the salient pole rotor laminations with segments of a nonmagnetic material (e.g., stainless steel) between the rotor poles. This method of fabricating salient pole rotor laminations is specifically described in G. B. Kliman U.S. application Ser. No. 138,404 filed Dec. 28, 1987, now U.S. Pat. No. 4,916,346 and assigned to the instant assignee, which is hereby specifically incorporated by reference.

SUMMARY OF THE INVENTION

A salient pole motor rotor comprising a central portion and multiple, radially extending pole pieces is constructed of laminations stacked one against the other. Continuous, nonmagnetic support members are inserted into the spaces between the radially extending pole pieces to support the rotor and to reduce windage losses. The filler material is a compatible, high strength, high electrical resistivity, non-magnetic alloy such as Inconel or titanium.

The support members may be attached to the rotor by any number of techniques, including welding the support element directly to the laminations or shaping the pole pieces to hold the support element in place. In particular, the support members may be held in place by fastening plates to either end of the rotor and attaching the support members to the plate by welding, for example.

One object of the present invention is to provide a reluctance motor in which the rotor includes continuous support members circumferentially located around the rotor in the space between each successive pair of pole pieces. These support members are, in turn, supported by end plates at either end of the rotor which act to support the rotor in lieu of a drive shaft therethrough.

It is another object of the present invention to provide a reluctance motor in which the pole pieces of the rotor are adapted to hold continuous support means in the space between the pole pieces of the rotor.

It is another object of the present invention to provide a reluctance motor in which the rotor laminations are held rigidly in place by support means which bear thereagainst.

It is another object of the present invention to provide a reluctance motor in which the magnetic rotor laminations are held rigidly in place by continuous support members which, in turn, are prevented from bowing by nonmagnetic support laminations interspersed among the rotor laminations.

It is another object of the present invention is to provide a method of fabricating a reluctance motor rotor wherein the rotor laminations are welded to support members in a continuous stack.

It is another object of the present invention to provide a method of fabricating a reluctance motor rotor wherein a nonmagnetic support element is welded to each individual lamination at the facing edges of each pair of successive pole pieces.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE PRIOR ART

Figure 1A:
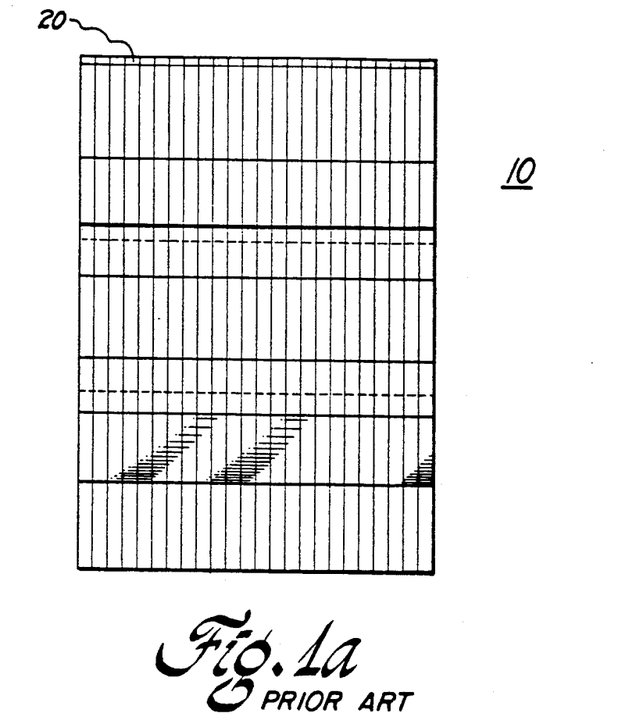
FIGS. 1a and 1b illustrate, in end view and side view, respectively, the lamination stack making up a typical reluctance motor rotor.
Figure 1B:
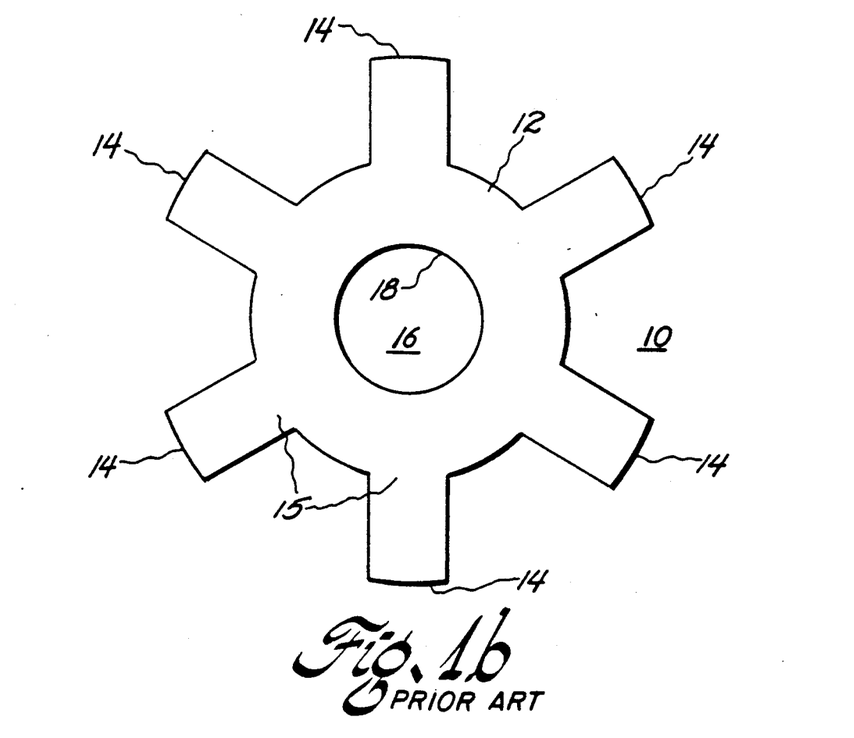

FIGS. 1a and 1b illustrate the active material of a typical reluctance motor rotor 10 with salient pole pieces 14. The rotor 10 is constructed of a stack of integral laminations 20. Central portion 12 includes rotor bore 16 through which a drive shaft may be inserted.

The usual methods of rotor construction for smaller motors involve shrinking the rotor stack of laminations 20 onto a small drive shaft. Shrinking the rotor onto a drive shaft results in substantially increased stresses within the laminations. The resulting stresses are maximized at the interior circumference 18 of the laminations. In addition, because pole pieces 14 are supported only at their roots 15, there is a local stress maximum at the pole roots, which results in an increased likelihood of rotor failure. The inherent saliency of rotor 10 in FIGS. 1a and 1b, moreover, leads to excessive windage losses at high speeds. The likelihood of rotor failure may be reduced by filling the gaps between salient poles with a nonmagnetic material which substantially reduces windage losses and provides support to pole pieces 14. The stresses at shaft/laminations interface which coincides with the laminations' interior circumference 18 may be further reduced by eliminating the drive shaft entirely and supporting the rotor entirely by a cage structure consisting of the nonmagnetic support members in the interpolar gaps which is held in place by end plates at either end of the rotor which include stub shafts.

DETAILED DESCRIPTION OF THE INVENTION

Figure 2:
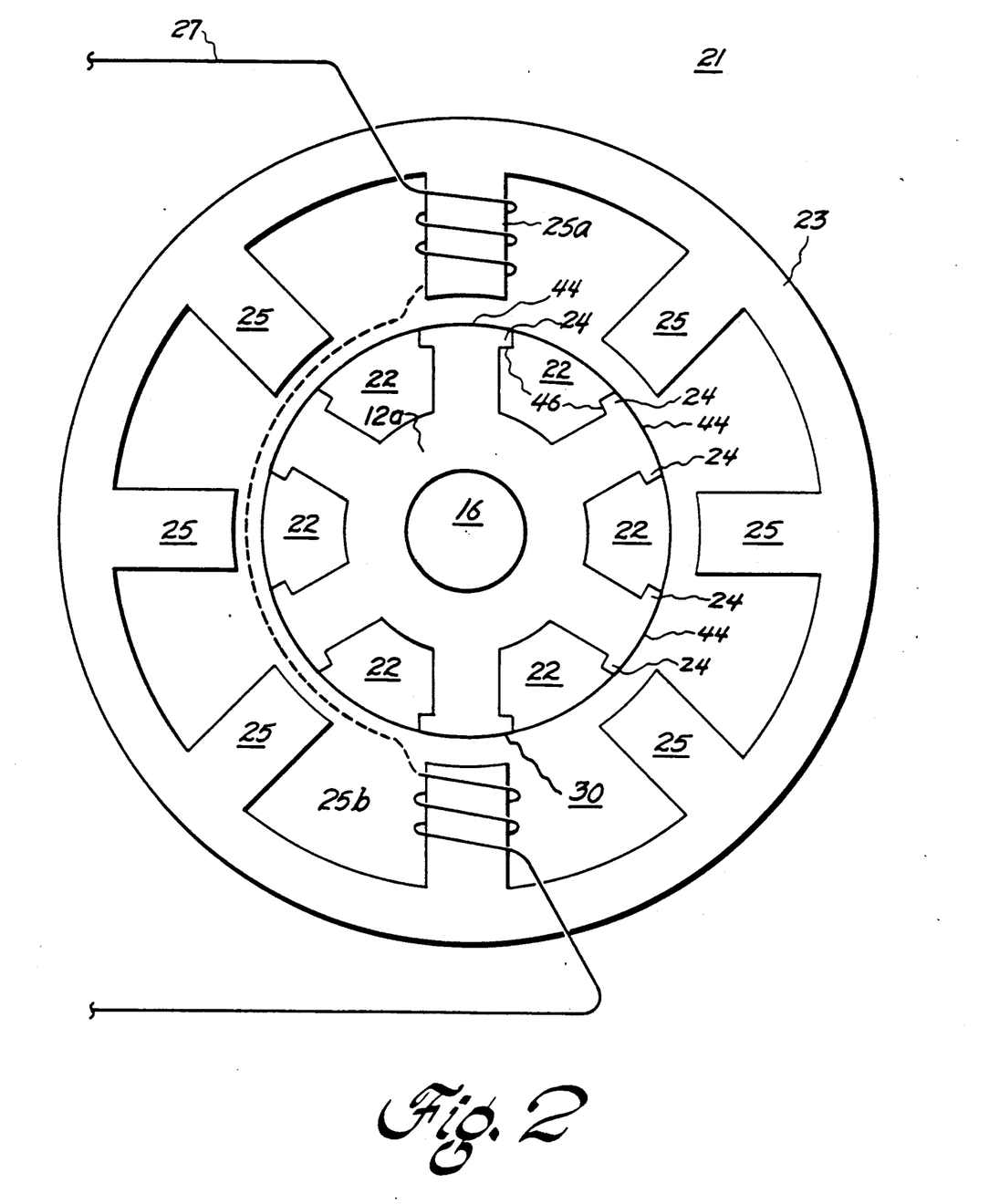
FIG. 2 illustrates, in end view, a cross section of a reluctance motor including a first embodiment of the lamination stack making up the rotor of the present invention.

FIG. 2 illustrates a cross section of a reluctance motor 21 including rotor 30 according to the present invention. In FIG. 2, laminated iron stator 23 surrounds rotor 30 in the radial direction and extends axially along rotor 30. Stator 23 of FIG. 2 further includes a plurality of stator poles 25. Each stator pole 25 is matched with the radially opposite stator pole to form a stator pole pair. Stator pole pairs 25a and 25b are wound with phase winding 27 which may be driven in a conventional manner from a remote source (not shown). Separate phase windings, (not shown), are also included on the other stator poles 25 in a like manner. Normally, the number of stator pole pairs exceeds the number of rotor pole pairs by 1. The phase windings of stator 23 are driven in a predetermined sequence to cause rotor 30 to move.

Rotor 30 in FIG. 2 is similar to rotor 10 of FIGS. 1a and 1b, but with nonmagnetic support members 22 in the spaces between pole pieces 44 to reduce windage losses. The laminations of rotor 30 include teeth 24 at the radially outermost portion of each of pole pieces 44, extending normal to the pole pieces at each side thereof pole pieces 44 extend radially outward from central portion 12a and together form an integral piece. The teeth are designed to hold support member 22 in place against centrifugal forces experienced during rotor rotation. For this purpose, support member 22 is formed with a shoulder 46 that abuts a respective tooth 24. Support member 22 may also be supported by end plates (not shown) at both ends of rotor 30.

Figure 3:
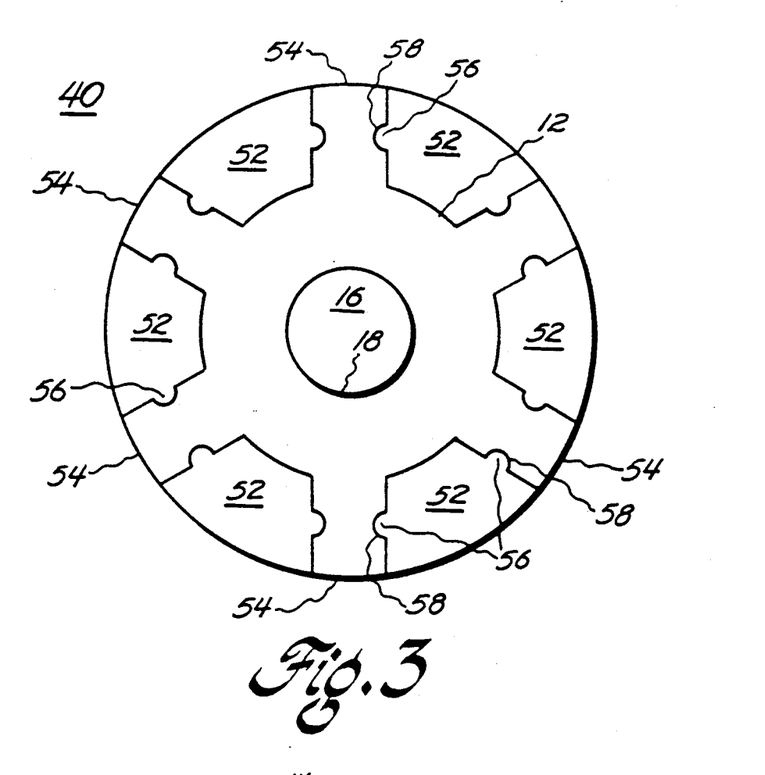
FIG. 3 illustrates, in end view, a second embodiment of the lamination stack making up the rotor of the present invention.

In FIG. 3, axially-extending notches 58 in pole pieces 54 of rotor 40 mate with protuberances 56 to hold nonmagnetic support member 52 in place against centrifugal force experienced during rotor rotation. Support members 52 may also be supported by end plates (not shown) at both ends of rotor 40.

Figure 4:
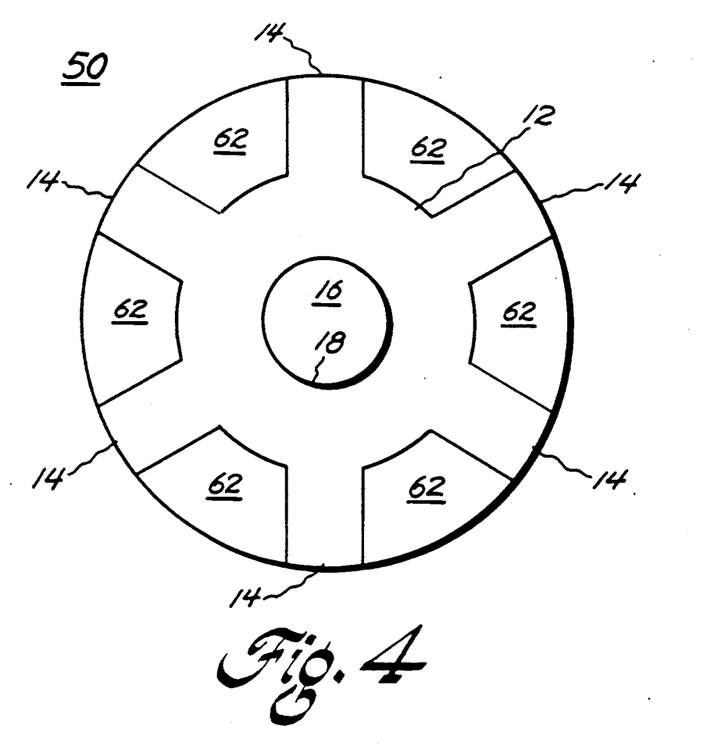
FIG. 4 illustrates, in end view, a third embodiment of the lamination stack making up the rotor of the present invention.

In FIG. 4, rotor 50 includes nonmagnetic support members 62 which fill the gaps between salient pole pieces 14 in the rotor stack of FIGS. 1a and 1b. Support members 62, like support members 22 of FIG. 2 and support members 52 of FIG. 3, extend axially through the entire length of the stack of rotor laminations, and are externally supported such as, for example, by end plates (not shown) at either end of the rotor stack.

In each of FIGS. 1a, 1b, 2 and 3 end plates may typically be fastened to the nonmagnetic support members in any manner suitable for retaining the support members rigidly in place against the centrifugal forces experienced during rotor rotation. Alternatively, or in conjunction with the end plates, the support members could be welded directly to the rotor laminations as will be described in greater detail hereinafter.

Although the rotor of FIGS. 1a and 1b may be strengthened and its windage losses reduced by inserting individual nonmagnetic support structures between each of the poles of each of the individual laminations as described previously with reference to G. K. Kliman application Ser. No. 138,404, now U.S. Pat. No. 4,916,346, it will be appreciated that the instant invention concerns an alternative method; that is, the rotor laminations are mounted on axially-extending bars of nonmagnetic material which fit into the spaces between the salient poles of the rotor. The bars thus form a "cage" which may be captured by teeth 24 as in the embodiment of FIG. 2, or by notches 58 (which may alternatively be described as holes) in the laminations of the rotor lamination stack as in the embodiment of FIG. 3. In addition, the bars may be fastened to rotor end plates (not shown) employed with any of the embodiments of FIGS. 2-4 to complete the "cage" structure.

The necessity of a through shaft, with its shrink fit, is obviated by the addition of stub shafts to the end plates.

In larger diameter machines, where "spiders" or other intermediate structures are normally used to retain a rigid rotor lamination stack, use of a "cage" structure would be a major benefit toward achieving even greater rigidity. Additionally, the present invention would be useful in "on shaft" starter-generators for large jet engines. In such starter-generators, the rotor is a thin shell around a large diameter engine shaft that experiences a high revolution rate during engine operation and would therefore benefit from the cage structure.

Methods of constructing a rotor according to the present invention may involve either electron beam or laser welding of the support members to the laminations. Alternatively, electron beam welding may be used to make deep penetration welds at the interface between the lamination and filler material.

Figure 5A:
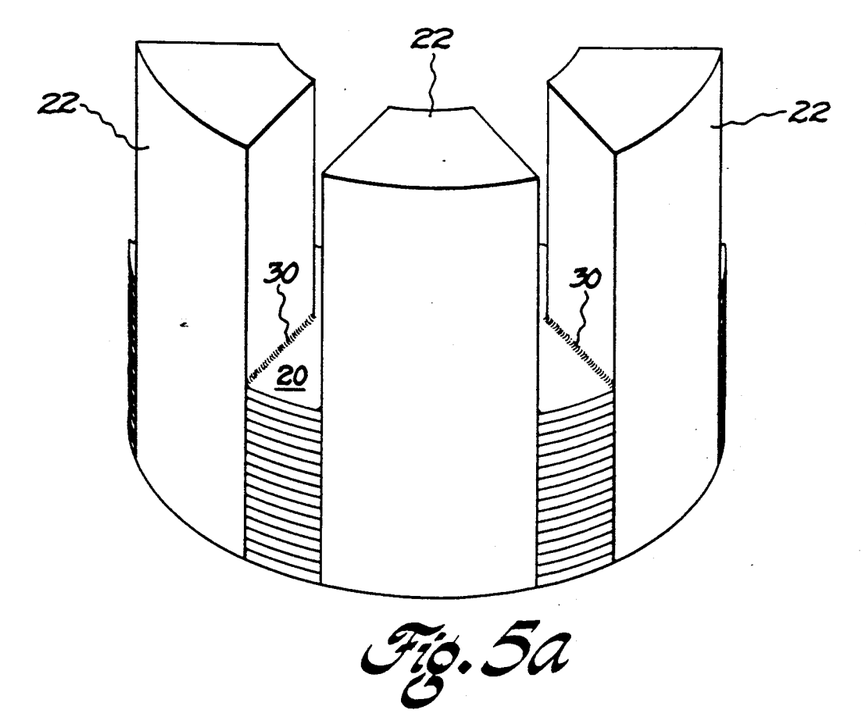
FIG. 5a illustrates, in partial perspective view, a step in the manufacture of one of the motor rotors of the present invention.

FIG. 5a illustrates a step in one method of manufacturing a reluctance motor rotor according to the present invention. As indicated in FIG. 5a, each support member 22 is welded along its interface 30 with the individual laminations of the stack 20 such that each support member 22 is welded to each lamination at at least two of the pole piece portions thereof. The welds along interface 30 are made as each lamination is stacked on the rotor. As illustrated in FIG. 5a, the stack of rotor laminations is only partially completed.

Figure 5B:
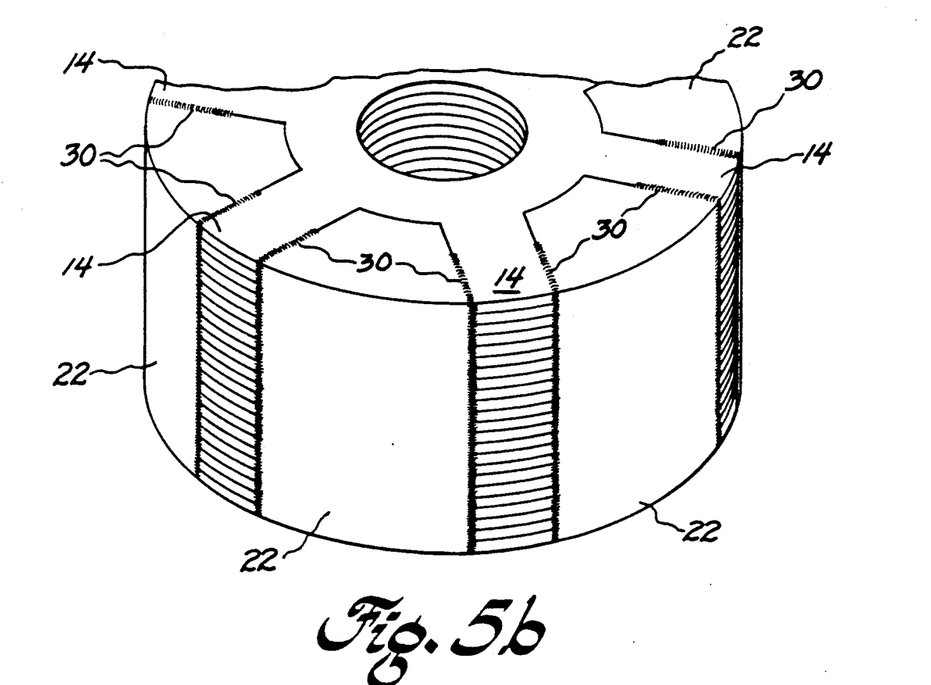
FIG. 5b illustrates, in partial perspective view, a step in an alternate method of manufacturing the motor rotors of the present invention.

FIG. 5b illustrates a modification of the method of rotor manufacture illustrated in FIG. 5a. As illustrated in FIG. 5b, all of the rotor laminations of stack 20 are first stacked on support members 22. Once the stack is substantially complete, the welds between the lamination pole pieces 14 and support members 22 are made along portions of interfaces 30 by deep penetration welding from above the rotor cylindrical surface.

Figure 6A:
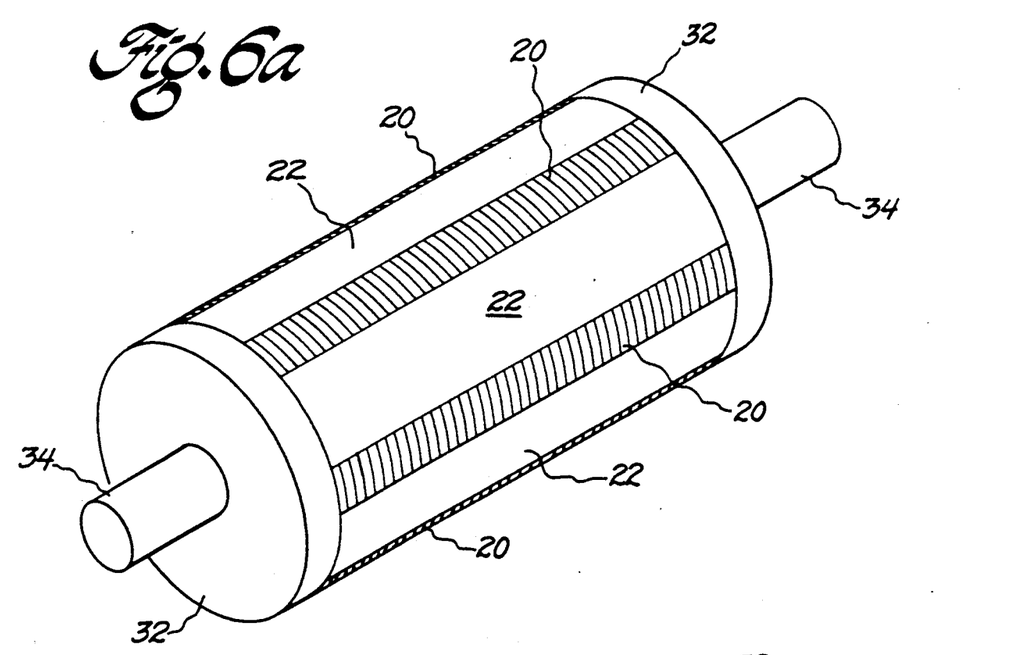
FIG. 6a illustrates, in perspective view, an embodiment of the present invention in which the rotor is supported by support members attached to an end plate.

FIG. 6a illustrates an embodiment of the invention which includes the end plates previously described with reference to FIGS. 2-4. As illustrated in FIG. 6a, individual laminations are stacked within the rotor along support members 22 which, in turn, are held in place by end plates 32. End plates 32 hold support members 22 in place by any one of a number of conventional methods, including welding of each end of each support member 22, respectively, to the interior side of each end plate 32. Each end plate 32 includes a stub shaft 34 which is attached thereto and extends outward from the exterior face of end plate 32. In FIG. 6a, the laminations must be snug against the support members if not welded to them. This may be accomplished by using filler material or by assembly with the cage heated to provide a small amount of shrink fit.

Figure 6B:
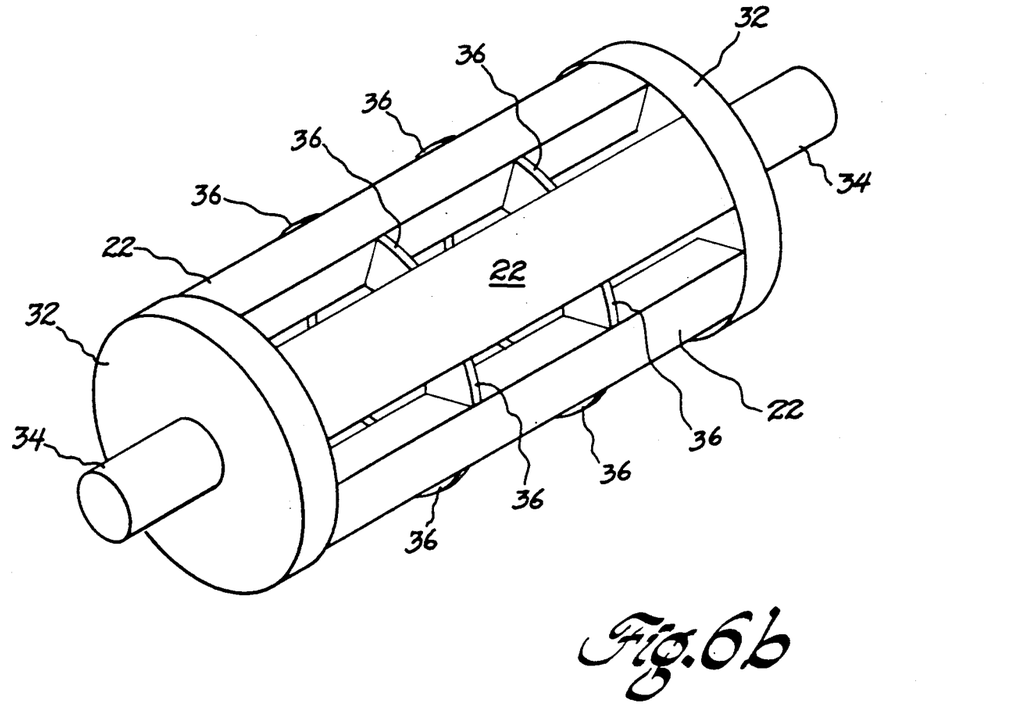
FIG. 6b illustrates, in perspective view, an embodiment of the invention in which the rotor of FIG. 6a further includes internal support laminations.

FIG. 6b illustrates a further embodiment of the invention in which the laminations of the rotor of FIG. 6a are removed for clarity to show nonmagnetic support laminations 36 spaced at predetermined intervals along the rotor to provide additional support to the rotor structure. FIG. 6b is not intended to represent a completed rotor. In FIG. 6b, the magnetic laminations of rotor lamination stack 20 are not illustrated, only nonmagnetic support laminations 36 are illustrated. Although the magnetic laminations of rotor stack 20 would be included in a completed rotor, they have been deleted from FIG. 6b to aid in illustrating the structure and function of support laminations 36. Support laminations 36, which may comprise, for example, stainless steel, may be attached to support members 22 by any suitable conventional method, such as welding. Support laminations 36 help to prevent bowing of support members 22 due to high centrifugal or other forces, especially in long rotors.

As previously indicated, the rotor of the present invention may be manufactured as, for example, without an internal drive shaft using the configuration illustrated in FIG. 6a or 6b. In such a rotor, the cage structure including support members 22 and end plates 32 translates the forces exerted on laminations 20 to stub shaft 34. This embodiment results in significant advantages over conventional rotors and rotors of the previously described embodiments of our invention which include an internal shaft.

The critical stress point, in rotors of conventional construction having a through shaft, is at the rotor-shaft interface. The stress at the rotor-shaft interface results from a combination of the inherent rotational stresses within the laminations and the required interference preload between the rotor and shaft. The interference preload is designed to maintain the rotor and shaft in frictional engagement at all times and thereby prevent the rotor from separating from the shaft at high speed.

Since support members 22 in the embodiments of FIGS. 6a and 6b are terminated by end plates 32 and stub shafts 34, the support structure comprises the total support of the laminations and transmits to the stub shafts all the torque generated in the laminations by the rotating electromagnetic fields of the motor. Therefore, in these embodiments, there is no need for interference preload and rotor bore 16 may be increased to the required electromagnetic diameter. That is, the diameter which optimizes the reluctance path between rotor pole pairs. Rotor bore 16 is not normally eliminated, even in rotors which do not include a through shaft, since including a rotor bore 16 reduces the weight of the rotor. In addition, rotor bore 16 may be used as a coolant passage.

The rotor of the invention therefore, eliminates much of the need to trade off electromagnetic properties against mechanical properties, since the electromagnetic and mechanical functions are assigned separately to different materials whose properties may be optimized for their particular functions. In particular, support member 22 is optimally manufactured of a highly rigid, substantially non-conducting material. Support member 22 is ideally nonconductive in order to minimize eddy current losses. It is, therefore, desirable to select a relatively non-conductive material such as fiber laminates or a low conductivity material such as titanium or Inconel which has a high stiffness to density ratio (i.e., a high ratio of Young's modulus to density). In addition, it may be desirable to use support members which are either hollow or honeycombed to further minimize density. Such hollow or honeycombed support members can also be used to cool the rotor more efficiently as will be described in more detail hereinafter. The air gaps in a hollow or honeycombed support member also beneficially function to further minimize any eddy currents resulting from the magnetic fields generated in the rotor, by limiting the conductive paths for such currents.

Figure 7:
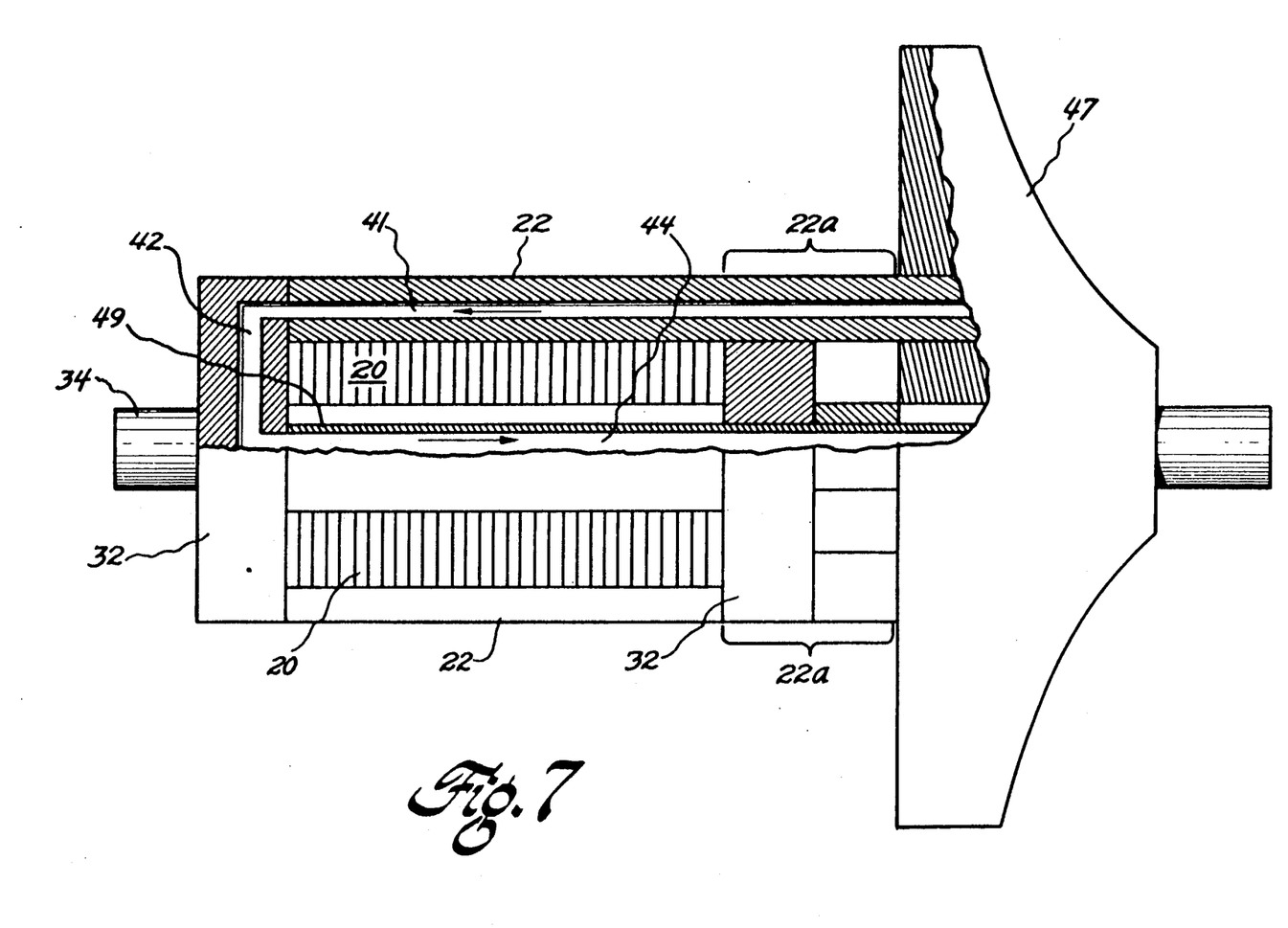
FIG. 7 illustrates, in side view, a switched reluctance motor rotor according to the present invention, further including an integral pump impeller and means for cooling the rotor.

FIG. 7 illustrates a further modification to the rotor support structure of FIGS. 6a and 6b, which results in an enhanced heat transfer system. As shown in FIG. 7, a rotor similar to that illustrated in FIG. 6a, for example, is modified to drive an integral pump and to include means for cooling the rotor during operation of the pump. One end of the rotor is connected to a pump impeller 47 via stub shaft 34. The impeller is, in turn, connected to support member 22 via a support extension 22a. When the motor turns, impeller 47 forces a portion of the pumped fluid through channels 41 in support members 22 and support extensions 22a. The coolant fluid is then forced through channels 42 in end plate 32 and on through opening 44 in internal shaft 49 and out of the rotor.

In conventional reluctance rotors, heat is transferred by conduction through the rotor laminations to the rotor shaft which is typically liquid cooled. Because all of the heat is conducted to the rotor shaft there is a substantial rise in temperature at the shaft-to-liquid interface. Since the liquid cooling system for the rotor shown in FIG. 7 includes hollow passages in support members 22, which conduct heat directly from the pole pieces, the surface of the heat transfer interface is increased substantially. In addition, the average length of the heat transfer path through the laminations is reduced. Hence both the temperature differential at the rotor-fluid surface and the absolute temperature rise of both the fluid coolant and the rotor is reduced. Additionally, since interfaces 30 (shown in FIGS. 5a and 5b) between the laminations and the support members are relatively low stress regions, heat transfer enhancing materials may safely be introduced at interfaces 30 to aid in the conduction of heat away from the rotor. Finally, as an alternative to the cooling system illustrated in FIG. 7, the hollow interior of the stack of laminations 20 in the rotor of FIG. 6a or 6b provides a convenient means to introduce air (or other fluid) coolant directly to the lamination interior diameter or to supply coolant flow to ducts that may be provided between the laminations.

From the foregoing it will be apparent that a switched reluctance motor rotor which satisfies all of the objects of the present invention has been developed. While preferred embodiments of the invention have been shown and described herein, it will be obvious to those skilled in the art that such embodiments are provided by way of example only. Numerous variations, changes, departures, substitutions and partial and full equivalents will occur to those skilled in the art without departing from the invention. Accordingly, it is intended that the invention be limited only by the spirit and scope of the appended claims.

What is claimed is:

1. A reluctance motor comprising:
   a stator capable of establishing a rotating magnetic field; and
   a rotor situated within said stator so as to be influenced by any rotating magnetic field established by said stator, said rotor comprising:
   a central portion comprised of a stack of laminations of magnetic material;
   multiple pole pieces, each of said pole pieces being defined by axially aligned portions of said laminations extending radially outward from said central portion; and
   nonmagnetic support members arranged circumferentially around said rotor, each of said members filling the spaces, respectively, between each pair of circumferentially successive radially extending pole pieces, respectively, and bearing against said central portion, each of said nonmagnetic support members extending continuously in an axial direction through the entire length of said stack and reducing windage losses while providing support to said multiple pole pieces during rotor rotation.

2. The motor of claim 1 including an end plate at each end of said rotor, each of said end plates being attached to each of said support members at a first and second end of said rotor so as to hold said support members in place.

3. The motor of claim 1 wherein each of said support members is welded to each of said laminations at at least two of the pole piece portions thereof.

4. The motor of claim 1 wherein each of the laminations making up said multiple pole pieces and said central portion comprises an integral piece.

5. The motor of claim 1 wherein each of said laminations further include means on either side of said pole pieces for holding said support members securely in place.

6. A reluctance motor comprising:
   a stator capable of establishing a rotating magnetic field; and
   a rotor situated within said stator so as to be influenced by any rotating magnetic field established by said stator, said rotor comprising:
   a central portion comprised of a stack of laminations of magnetic material;
   multiple pole pieces defined by portions of said laminations extending radially outward from said central portion; and
   nonmagnetic support members filling the spaces between said radially extending pole pieces and bearing against said central portion, each of said laminations further comprising means on either side of said pole pieces for holding said support members securely in place including notches in said pole pieces, each of said nonmagnetic support members extending continuously in an axial direction through the entire length of said stack and reducing windage losses while providing support to said multiple pole pieces during rotor rotation.

7. The rotor of claim 6 wherein said support members include protuberances which mate with said notches.

8. The rotor of claim 5 wherein said means for holding include teeth on said pole pieces.

9. The rotor of claim 8 wherein said teeth are located at a radially outermost portion of each of said pole pieces.

10. The motor of claim 8 wherein said support members include shoulders which abut against said teeth.

11. The motor of claim 1 wherein said stack of laminations of magnetic material includes nonmagnetic support lamination means interspersed therein to provide support to said support members.

12. The motor of claim 1 wherein said support members include heat transfer means to remove heat from said laminations during rotation of said rotor.

13. A reluctance motor comprising:
   a stator capable of establishing a rotating magnetic field; and
   a rotor situated within said stator so as to be influenced by any rotating magnetic field established by said stator, said rotor comprising:
   a central portion comprised of a stack of laminations of magnetic material;
   multiple pole pieces defined by portions of said laminations extending radially outward from said central portion; and nonmagnetic support members filling the spaces between said radially extending pole pieces and bearing against said central portion, each of said nonmagnetic support members extending continuously in an axial direction through the entire length of said stack and reducing windage losses while providing support to said multiple pole pieces during rotor rotation, said support members including heat transfer means to remove heat from said laminations during rotation of said rotor, said heat transfer means including a passageway in each of said support members respectively for conducting cooling fluids through said rotor.

14. A reluctance motor comprising:
a stator capable of establishing a rotating magnetic field; and
a rotor situated within said stator so as to be influenced by any rotating magnetic field established by said stator, said rotor comprising:
a central portion comprised of a stack of laminations of magnetic material;
multiple pole pieces defined by portions of said laminations extending radially outward from said central portion; and
nonmagnetic support members filling the spaces between said radially extending pole pieces and bearing against said central portion, each of said nonmagnetic support members extending continuously in an axial direction through the entire length of said stack and reducing windage losses while providing support to said multiple pole pieces during rotor rotation, said support members including heat transfer means to remove heat from said laminations during rotation of said rotor, said rotor including an impeller affixed to one end thereof to pump cooling fluids through said heat transfer means.

* * * * *